March 16, 1948. D. VAN MEETEREN 2,438,080
POULTRY FEEDER
Filed Nov. 7, 1945 2 Sheets-Sheet 1

Inventor
Donald Van Meeteren

By Clarence A. O'Brien
and Harvey B. Jacobson
Attorneys

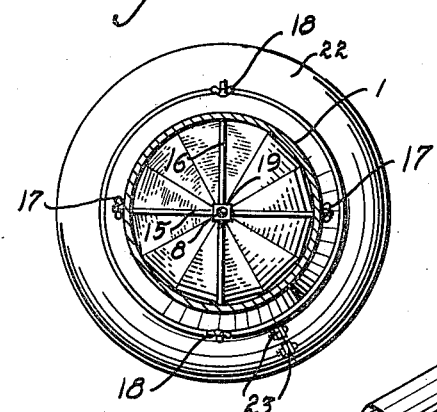
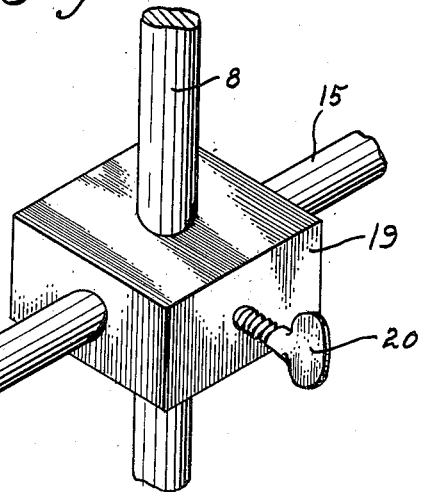
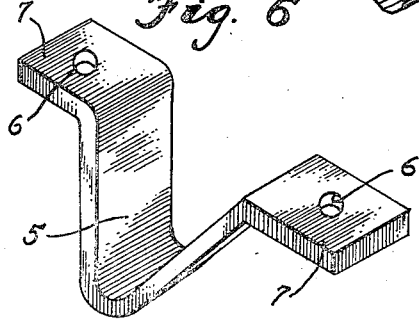
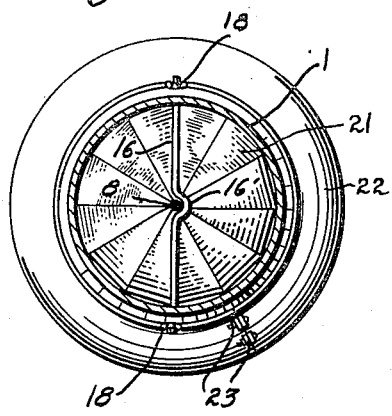
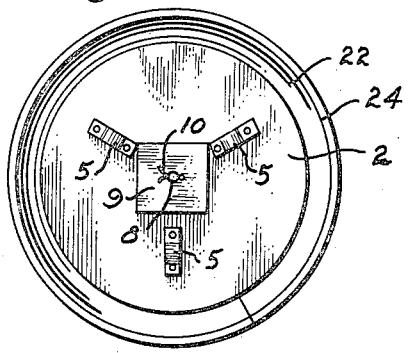

Patented Mar. 16, 1948

2,438,080

UNITED STATES PATENT OFFICE 2,438,080

POULTRY FEEDER

Donald Van Meeteren, Sheldon, Iowa

Application November 7, 1945, Serial No. 627,113

1 Claim. (Cl. 119—53)

This invention relates to a poultry feeder, and it is one object of the invention to provide a device of this character which may be set upon a floor or upon the ground in a chicken yard or suspended from an overhead support by means of a suspension rod, the feeder being of such construction that feed placed in the body portion or container of the feeder will move by gravity to a pan at the bottom of the container where the chickens or other poultry can have access to the feed.

Another object of the invention is to provide a poultry feeder wherein a rod extends vertically through the container which is shiftable vertically along the rod in order that predetermined space may be provided between the lower end of the container and the bottom of a pan carried by the rod and thus control the flow of feed from the container into the pan for consumption by the poultry seeking it.

A further object of the invention is to provide a poultry feeder having a conical member carried by the base or pan and extending upwardly into the open, lower end of the container so that feed flowing downwardly in the container will be directed under the lower edge of the container and into the marginal portion of the pan surrounding the conical deflector.

Another object of the invention is to provide the feeder with a canopy which surrounds the container and serves to prevent rain from wetting feed in the pan and also serves to prevent fowls from stepping into the portion of the pan surrounding the open, lower end of the container.

Another object of the invention is to provide a poultry feeder having a container which gradually increases in diameter toward its lower end and thus prevent feed from clogging in the container and failing to flow freely into the pan.

Another object of the invention is to provide a poultry feeder with a cover which may be shifted upwardly and secured in a raised position while filling the container, the cover being of such shape that fowls will be prevented from roosting upon the feeder.

The invention is illustrated in the accompanying drawing, wherein.

Figure 1:
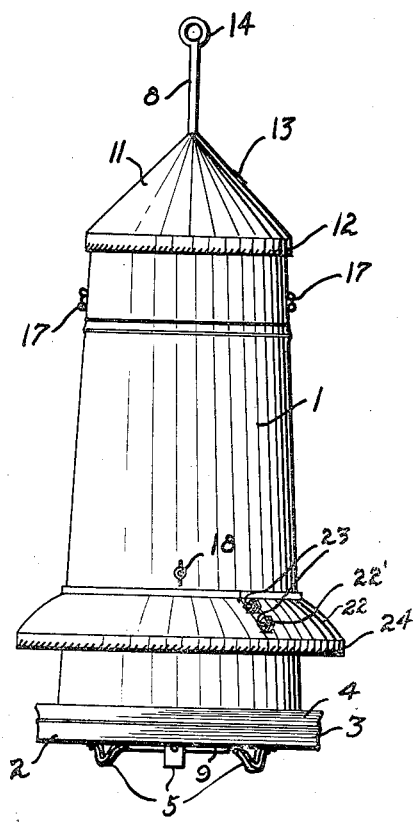
Figure 1 is a side elevation of the improved poultry feeder.
Figure 3:
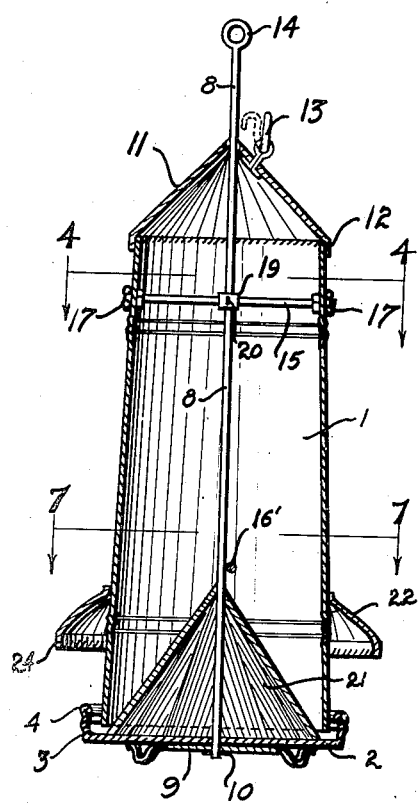
Figure 2:
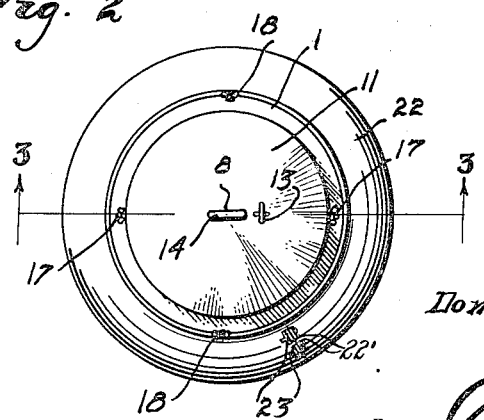
Figure 2 is a top plan view thereof.

Figure 3 is a sectional view taken vertically through the feeder along the line 3—3 of Figure 2, Figure 4 is a sectional view taken transversely through the upper portion of the container along line 4—4 in Figure 3, Figure 5 is an enlarged perspective view illustrating the manner in which a vertical rod and a transversely extending bracing rod are held to each other, Figure 6 is a perspective view of one of the feet for the feeding pan, Figure 7 is a sectional view taken along the line 7—7 of Figure 3, and Figure 8 is a bottom plan view of the feeder.

This improved poultry feeder has a body or container 1 formed of galvanized sheet metal or other suitable material. The body or container is open at its upper end and also at its lower end and is circular in cross section and gradually reduced in diameter toward its upper end so that when grain, mash, or other feed is placed in the container it may readily move downwardly therein instead of forming a mass of caked feed in the container. The lower portion of the container fits into a feeding pan 2 which is also formed of galvanized sheet metal or other suitable material and has the upper edge portion of its wall 3 rolled to form a bead 4. The diameter of the pan is such that the wall 3 is in spaced concentric relation to the lower end of the container 1, thus providing a feeding space about the lower portion of the container into which feed may flow from the open, lower end of the container. Substantially V-shaped feet 5 formed from thin strips of sheet metal are secured against the underface of the pan by fasteners passed through openings 6 in end portions 7 of the feet, and these feet extend radially of the pan in such spaced relation to each other circumferentially thereof, that the feeder will be well supported when set upon the floor of a poultry house or upon the ground in a poultry yard. Since the bottom of the pan will be held in spaced relation to the floor or ground, damage to the pan by rust will be eliminated.

It is desired to have the container so mounted that it may be shifted vertically and secured with its lower end in desired spaced ralation to the bottom of the pan. In order to do so, there has been provided a rod 8 which extends vertically in the container with its lower end passing through the bottom of the pan and also through a plate 9 serving as a reinforcement for the portion of the pan through which the rod passes, and referring to Figures 3 and 8, it will be seen that a cotter key 10 is passed through an opening formed in the protruding lower end of the rod to prevent undesired upward movement of the rod through the pan. This rod 8 extends upwardly from the container, and about its upper portion is disposed a conical cover 11 having a rim 12 about its lower end for fitting snugly about the open, upper end of the container. By shifting the cover upwardly along the rod, feed may be poured into the container through the upper end thereof and in order that the cover may be temporarily held in raised position while filling the container, there has been provided a hook 13 for engaging through the eye 14 at the upper end of the rod. By tying a strong cord through the eye, the feeder may be suspended from an overhead support in a poultry house or yard if so desired. Bracing rods 15 and 16 extend diametrically through the container with their end portions passed through openings in the wall of the container and carry wing nuts 17 and 18 which prevent them from slipping out of place. The lower rod 16 is bent midway its length, as shown at 16′, so that it may pass about the rod 8, but the upper rod 15 passes through a block 19 which fits about the rod 8 and carries a set-screw 20 for engaging the rod 8. When the set-screw 20 is loosened the container may be shifted vertically along the rod and the set-screw again tightened very easily by reaching inwardly through the open, upper end of the container. It will thus be seen that the container may be readily adjusted to dispose its open, lower end in desired spaced relation to the bottom of the pan and flow of feed into the pan controlled. A conical deflector 21 formed of fluted or corrugated sheet metal rests upon the bottom of the pan concentric thereto where it is soldered or otherwise firmly secured to the pan and at its apex the deflector is formed with an opening through which the rod passes. This deflector causes grain or other feed in the container to be directed toward side walls of the container and into the marginal portion of the pan between the margin of the deflector and the wall 3 of the pan. It will thus be seen that feed passing from the container will flow into marginal portions of the pan where it will be within easy reach of fowls feeding from the pan. A canopy 22 fits snugly about the container and is formed from galvanized sheet metal, end portions of the strip of metal from which the canopy is formed being held to each other by ears 22′ and bolts 23 so that the canopy may be constricted about the container and held in desired upwardly spaced relation to the lower ends thereof.

This canopy is of frusto-conical shape so that rainwater will be prevented from gathering upon its upper surface and cause rusting, and about its outer or lower edge the canopy is formed with a depending flange 24 spaced outwardly from the wall 3 of the pan such a distance that water dripping from the canopy will not enter the pan. It will thus be seen that rainwater will be very effectively prevented from entering the pan and causing feed in the pan to become wet and form a cake which would prevent free flow of feed from the container into the pan for consumption by chickens and other fowls.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

What is claimed is:

A poultry feeder comprising a vertically disposed frustoconical container open at the upper and lower ends, a pan over which said container is disposed having an upstanding marginal wall surrounding the lower end portion of the container in spaced relation thereto, a rod extending vertically through the container and having its lower end held to the pan, a conical deflector extending upwardly from said pan into the lower portion of said container and at its apex formed with an opening through which said rod passes, said container being shiftable vertically along the rod to dispose the lower end of the container in desired spaced relation to the conical deflector, a cover for the open, upper end of said container formed with an opening through which the rod passes and being shiftable vertically along the rod into and out of closing relation to the upper end of the container, an eye on the upper end of said rod whereby the feeder may be suspended, and a hook on said cover engageable with said eye to retain the cover out of closing relation with the upper end of the container.

DONALD VAN MEETEREN.

REFERENCES CITED

The following references are of record in the file of this patent:

UNITED STATES PATENTS

| Number | Name | Date |
|---|---|---|
| 1,114,482 | Johnson | Oct. 20, 1914 |
| 1,601,030 | Love | Sept. 28, 1926 |
| 1,666,322 | West | Apr. 17, 1928 |

FOREIGN PATENTS

| Number | Country | Date |
|---|---|---|
| 248,910 | Great Britain | Mar. 18, 1926 |
| 137,691 | Australia | May 25, 1934 |